United States Patent
Richter et al.

(10) Patent No.: US 10,954,319 B2
(45) Date of Patent: *Mar. 23, 2021

(54) PRODUCTION OF A PMMA FOAM USING CROSS-LINKING AGENTS, REGULATORS AND BLOWING AGENTS

(71) Applicant: Evonik Operations GmbH, Essen (DE)

(72) Inventors: Thomas Richter, Darmstadt (DE); Christoph Seipel, Babenhausen (DE); Kay Bernhard, Darmstadt (DE); Sivakumara K Krishnamoorthy, Pfungstadt (DE); Sebastian Buehler, Freiburg (DE)

(73) Assignee: Evonik Operations GmbH, Essen (DE)

( * ) Notice: Subject to any disclaimer, the term of this patent is extended or adjusted under 35 U.S.C. 154(b) by 96 days.

This patent is subject to a terminal disclaimer.

(21) Appl. No.: 15/554,488

(22) PCT Filed: Mar. 21, 2016

(86) PCT No.: PCT/EP2016/056085
§ 371 (c)(1),
(2) Date: Aug. 30, 2017

(87) PCT Pub. No.: WO2016/156078
PCT Pub. Date: Oct. 6, 2016

(65) Prior Publication Data
US 2018/0066078 A1  Mar. 8, 2018

(30) Foreign Application Priority Data

Mar. 31, 2015 (EP) .................................... 15161898

(51) Int. Cl.
| | | |
|---|---|---|
| *C08F 2/38* | (2006.01) | |
| *C08F 220/14* | (2006.01) | |
| *C08J 9/00* | (2006.01) | |
| *C08J 9/14* | (2006.01) | |
| *C08J 9/02* | (2006.01) | |
| *C08J 9/06* | (2006.01) | |
| *C08F 20/14* | (2006.01) | |
| *C08F 2/44* | (2006.01) | |
| *C08J 9/228* | (2006.01) | |
| *C08L 33/12* | (2006.01) | |
| *C08F 222/10* | (2006.01) | |

(52) U.S. Cl.
CPC .................. *C08F 2/38* (2013.01); *C08F 2/44* (2013.01); *C08F 20/14* (2013.01); *C08F 220/14* (2013.01); *C08J 9/02* (2013.01); *C08J 9/06* (2013.01); *C08J 9/142* (2013.01); *C08J 9/228* (2013.01); *C08L 33/12* (2013.01); *C08F 222/102* (2020.02); *C08J 2201/026* (2013.01); *C08J 2203/12* (2013.01); *C08J 2205/046* (2013.01); *C08J 2205/10* (2013.01); *C08J 2207/00* (2013.01); *C08J 2333/12* (2013.01)

(58) Field of Classification Search
CPC . C08F 2/38; C08F 20/14; C08F 220/14; C08J 9/02; C08J 9/06; C08J 9/142; C08J 9/228; C08J 2333/12; C08J 2201/026; C08J 2203/12
See application file for complete search history.

(56) References Cited

U.S. PATENT DOCUMENTS

| | | | |
|---|---|---|---|
| 4,419,459 A | 12/1983 | Melchior | |
| 4,816,492 A | 3/1989 | Schiller et al. | |
| 5,053,437 A | 10/1991 | Moll et al. | |
| 8,722,751 B2 | 5/2014 | Scherble et al. | |
| 2014/0134422 A1* | 5/2014 | Kraatz | B29C 44/1228 428/304.4 |
| 2016/0332344 A1 | 5/2016 | Bernhard et al. | |

FOREIGN PATENT DOCUMENTS

| | | |
|---|---|---|
| CN | 1856531 A | 11/2006 |
| CN | 100390223 C | 5/2008 |
| EP | 0 032 720 B1 | 7/1985 |
| EP | 0 068 439 B1 | 2/1987 |
| FR | 1.423.844 A | 1/1966 |
| IL | 62693 A | 11/1984 |
| JP | 48-43054 A | 6/1973 |
| JP | 55-139433 A | 10/1980 |
| JP | 2000-86804 A | 3/2000 |
| JP | 2000086804 A * | 3/2000 |
| JP | 2001-233986 A | 8/2001 |
| JP | 2001-302733 A | 10/2001 |
| JP | 2002-3635 A | 1/2002 |
| JP | 2006-45256 A | 2/2006 |
| JP | 2010-18647 A | 1/2010 |
| JP | 2012-201704 A | 10/2012 |
| JP | 2012-201705 A | 10/2012 |

(Continued)

OTHER PUBLICATIONS

US 4,443,391 A, 04/1984, Melchior (withdrawn)

(Continued)

*Primary Examiner* — Kara B Boyle

(74) *Attorney, Agent, or Firm* — Oblon, McClelland, Maier & Neustadt, L.L.P.

(57) ABSTRACT

The present invention relates to novel types of PMMA foams and also to the production thereof. The recipes used in the production process include particularly crosslinkers and chain transfer agents as recipe constituents, mostly in low concentrations, in addition to suitable blowing agents. It was found that, surprisingly, the invention provides a simple-to-produce stable PMMA foam having very good properties.

8 Claims, No Drawings

(56) References Cited

FOREIGN PATENT DOCUMENTS

JP           2013-75935 A     4/2013
WO    WO-2010149441 A1 * 12/2010   ............. C08J 9/122

OTHER PUBLICATIONS

International Search Report dated Jun. 2, 2016 in PCT/EP2016/056085 filed Mar. 21, 2016.
European Search Report dated Jul. 20, 2015 in European Application 15161898.0 filed Mar. 31, 2015.
U.S. Appl. No. 15/558,605, filed Sep. 15, 2017, Thomas Richter et al.

* cited by examiner

PRODUCTION OF A PMMA FOAM USING CROSS-LINKING AGENTS, REGULATORS AND BLOWING AGENTS

FIELD OF THE INVENTION

The present invention relates to novel types of PMMA foams and also to the production thereof. The recipes used in the production process include particularly crosslinkers and chain transfer agents as recipe constituents, mostly in low concentrations, in addition to suitable blowing agents. It was found that, surprisingly, the invention provides a simple-to-produce stable PMMA foam having very good properties.

PRIOR ART

Rigid polymeric foams are generally/commonly known and are widely used, for example as insulating material, in packaging and also in lightweight construction. The foams should have high strengths coupled with low density when used in lightweight construction in particular. The foams used therein include PVC, PET, specific PU and P(M)I(poly (meth)acrylamide) foams, and they are used inter alia as core material in sandwich composites.

PMMA foams are extensively described in the literature, but have hitherto achieved little if any industrial significance. One reason is the frequently described, but very complicated production via autoclave processes in which PMMA is loaded with gaseous blowing agents, e.g. $CO_2$ or $N_2$, under high pressures in an autoclave and then expanded by release of pressure. Rigid PMMA foams blown with a blowing agent added to the monomer before polymerization and dissolved in the polymer after polymerization are little described, by contrast. Nonetheless, PMMA foams are by virtue of their strength and weathering resistance potentially very interesting engineering materials for lightweight construction.

Sekisui has a number of patent applications describing the production of "acrylic foams" (e.g. JP 48043054, JP 2002003635, JP 2006045256, JP 2012201704, JP 2012201705, JP 2013075935). However, these patent applications describe distinct amounts of styrene and/or methacrylamides as comonomers in addition to MMA. The blowing agent used is predominantly urea. Urea as a blowing agent, however, can lead to problems due to poor solubility in the monomer mixture, and this can in turn lead to inhomogeneity in the foam. A further disadvantage with urea as blowing agent is that it acts as a blowing agent by virtue of its decomposition into CO and $NH_3$. So the foaming temperature always has to be above the decomposition temperature of urea, greatly curtailing the scope for varying the foaming temperature. Furthermore, $NH_3$ and CO are toxic.

JP 55139433 describes the production of a foam containing between 4 and 35 wt % of acrylic and/or methacrylic acid as comonomer as well as urea and water as blowing agent. This is not a PMMA foam in the true sense.

U.S. Pat. No. 4,816,492 describes the production of (meth)acrylate-based foams wherein the monomer mixture is polymerized in the presence of blowing agents. The blowing agents used are halogenated hydrocarbons. Halogenated hydrocarbons, however, are problematic in that they have a severely adverse effect on the ozone layer and therefore are subject to significant restrictions. Furthermore, there are restrictions on the degrees of freedom in the foaming operation in that cell size, cell distribution and foam density are adjustable only to a limited extent and not independently of each other.

IL 62693A and EP 0 032 720 describe the production of a foamed PMMA intentionally having very coarse cells. Production proceeds via swelling in MMA of PMMA bead polymers comprising blowing agent and the subsequent expanding and polymerizing with expansion taking place before curing. The blowing agent is chosen so as to blow the PMMA beads at a temperature below that which would cause the still liquid, reactive resin to polymerize. The focus is all the while on producing a polymeric foam that is transparent. One issue with this process is that the polymerization is not yet complete at the time of foaming and therefore the cells only become successfully stabilized within very narrow processing parameter limits.

EP 0 068 439 discloses the production of PMMA-based foams by polymerization of MMA in the presence of a blowing agent and subsequent foaming. It must be emphasized here that a plasticizing agent, in particular a methacrylic ester having three or more carbon atoms in the alkyl group, is used in amounts between 5 and 40 parts by weight, based on MMA, explicitly to obtain foams. The blowing agents are said to be hydrocarbons and/or (hydro)fluorocarbons. The purpose is to produce foams having large cells of, for example, about 5 mm diameter and thus retain the transparency of the base polymer in contradistinction to more finely cellular foams. However, the comparatively long-chain alkyl moieties have a flexibilizing effect on the matrix polymer that is mechanically unwelcome for rigid foam applications in particular. Halogenated hydrocarbons are further also among the blowing agents described. The teaching of EP 0 068 439 is likewise but limited to very large cells in the foam matrix.

FR 1423844 describes the production of PMMA that contains bubbles, wherein the blowing agent used is AIBN, which also acts as the initiator for the polymerization. The concentration of initiator is accordingly high and so the molar mass of the matrix polymer in the foam is very low. The very low molar mass in turn has adverse consequences for the mechanical properties of the foam. The exemplified foams, however, have but a low number of unevenly distributed cells. The densities obtained are also not reported.

Problem

The problem addressed by the present invention was therefore that of providing a novel process for producing PMMA foams without the discussed disadvantages of the prior art.

The problem addressed by the present invention for this purpose was in particular that of providing a PMMA recipe which is readily foamable while allowing high degrees of freedom with regard to the establishment of cell size, cell distribution and foam density. On the other hand, the foamed material shall have a very high level of mechanical strength.

The problem addressed by the present invention in relation thereto was in particular that of achieving the objects to provide a PMMA recipe which is suitable for foaming and which shall have adequate flowability for foaming but also a high molecular weight as a foam—without plasticizers being employed for this purpose, or a monomer-based composition being foamed and only then being polymerized. These objectives at first appear to be in particular mutually exclusive.

The problem addressed by the present invention was in particular that of providing PMMA foams having a foaming factor of at least 2 and hence a density below 150 kg/m³.

This process shall further eschew blowing agents that are toxic and/or environmentally harmful and/or have a high ODP (ozone depletion potential), as is for example the case with most (hydro)halocarbons.

Further problems addressed without explicit recitation thereof may become apparent from the overall context of the invention, from the claims, from the description or from the examples.

Solution

The problems are solved by a novel type of process for producing PMMA foams, which comprises producing said foams by a polymerization, as by a slab polymerization for example, of monomer mixtures containing predominantly MMA and/or of a syrup consisting of a polymer consisting wholly or predominantly of MMA and a monomer mixture composed wholly or predominantly of MMA, in the presence of a blowing agent that is non-gaseous under polymerization conditions. The fully polymerized PMMA slab thus obtained, which is laden with blowing agent, is then foamed up in a second step by heating.

This process is particularly characterized in that a composition, containing from 0.01 to 2.0 wt %, preferably from 0.2 to 1.5 wt % of one or more initiators, from 2 to 20 wt %, preferably from 3 to 15 wt % of one or more blowing agents, and from 75 to 97.9 wt %, preferably from 80 to 96.8 wt % of a monomer mixture is initially polymerized at a temperature between 20° C. and 100° C., preferably between 30° C. and 70° C., and subsequently foamed at a temperature between 130° C. and 250° C., preferably between 150° C. and 230° C. In addition to the recited components, the composition may contain up to 22.99 wt % of further components. Examples of these further components are, in particular, further polymeric components other than polymers comprising MMA, UV stabilizers, fillers and pigments.

The monomer mixture used is composed of from 79.70 to 99.995 mol %, preferably from 89.85 to 99.988 mol %, of MMA, 0 to 20 mol %, preferably 0 to 10 mol % of one or more MMA-copolymerizable monomers, from 0.002 to 0.5 mol %, preferably from 0.005 to 0.3 mol % of crosslinker and from 0.003 to 1.5 mol %, preferably from 0.006 to 1 mol % of chain transfer agent. The copolymerizable monomers as well as MMA may be fully used therein as monomers. In a more conveniently handleable embodiment of the invention, however, it is also possible for up to 80 wt %, preferably not more than 50 wt % of the MMA and the copolymerizable monomers to be present as polymer and/or oligomer. The advantage of such a syrup, consisting of monomers and polymers/oligomers, is that it has a higher viscosity than a purely monomeric mixture and also develops a lower vapour pressure in the polymerization.

The MMA-copolymerizable monomers may comprise in particular acrylates, such as, in particular, methyl acrylate, ethyl acrylate, propyl acrylate or n-butyl acrylate. The copolymerization of acrylates serves to additionally stabilize the foam at high foaming temperatures in particular, since these foaming temperatures may be above the ceiling temperature of straight MMA. When no stabilizing comonomers are incorporated, a shorter foaming time or a correspondingly lower foaming temperature is preferable.

Further examples of suitable comonomers are (meth) acrylic acid, methacrylates, such as ethyl methacrylate, propyl methacrylate, n-butyl methacrylate, tert-butyl (meth) acrylate, isopropyl (meth)acrylate, isobutyl (meth)acrylate, styrene, (meth)acrylamide, an N-alkyl(meth)acrylamide having 1 to 12 carbon atoms in the alkyl group, a hydroxyalkyl (meth)acrylate having 1 to 4 carbon atoms in the alkyl group, a polyether (meth)acrylate where the polyether may have a molecular weight between 200 and 5000. These comonomers may also take the form of a mixture of two or more thereof. When these comonomers comprise n-butyl (meth)acrylate and/or n-propyl (meth)acrylate, the proportion of the overall composition attributable to them should not exceed a combined 3 wt %.

The crosslinkers preferably comprise a di-, tri- or tetra (meth)acrylate, allyl (meth)acrylate, triallyl cyanurate, triallyl isocyanurate or a mixture containing two or more thereof.

The chain transfer agent preferably comprises a compound having from one to five mercaptan groups, a γ-terpinene or a mixture of two or more thereof. The chain transfer agent comprises with particular preference pentaerythritol tetrathioglycolate, 2-mercaptoethanol, an alkyl mercaptan having from 2 to 12 carbon atoms, thioglycolic acid, a thioglycolate, γ-terpinene or a mixture of two or more thereof.

A particularly important aspect of the present invention is that of using crosslinkers and chain transfer agents in the composition to be foamed. This combination of components is novel over the prior art and has the surprising effect of distinctly enhancing the foamability of PMMA laden with blowing agents and of providing a stable foam possessing a particularly good, i.e. narrow, cell size distribution. This effect of the present invention was in particular unforeseeable and hence surprising, since normally the employment of crosslinkers would impair polymer flowability and should thus lead to inferior foamability.

The described combination of relatively small amounts of crosslinker with the described small amounts of chain transfer agent has a particularly positive effect on foamability in particular, since the employment of the crosslinker causes foamability to improve such that the employment of comparatively large amounts of chain transfer agent can be eschewed. This is advantageous because the mechanical properties of the matrix polymer and hence those of the PMMA foam itself are not adversely affected. Furthermore, high molar masses or—better—crosslinked polymers are very desirable for superior foam mechanicals. In principle, good foamability of a polymer requires a certain level of plasticity/flowability on the part of the matrix polymer at the foaming temperature, since the foaming process requires the matrix polymer to flow. If the plasticity/flowability of the matrix polymer at the foaming temperature is too low, no foaming takes place. It is common general knowledge that the flowability of a polymer generally decreases with increasing molar mass for a given temperature. Foamability and a very high molar mass accordingly appear to be contradictory requirements. Surprisingly, this contradiction is resolved by admixing small amounts of crosslinker and a but reduced amount of a chain transfer agent.

The PMMA foams obtained according to the present invention further have a surprisingly high strength and also a surprisingly low brittleness and therefore can, for example, find application in lightweight construction. By reason of the good properties of the material it is further possible to eschew the employment of plasticizers, e.g. comparatively long-chain alkyl (meth)acrylates or phthalates, which as far as is known to date have a positive effect on the flowability and/or foamability, yet at the same time cause the mechanical properties of the PMMA foam, in particular its strength, to be adversely affected.

However, it was also found that, just as surprisingly, the chain transfer agent cannot be entirely eschewed, but that small amounts have to be added nonetheless to ensure optimum foaming.

Particularly suitable blowing agents comprise tert-butanol, n-heptane, MTBE, methyl ethyl ketone, an alcohol having from one to four carbon atoms, water, methylal, urea, tert-butyl methyl ether, isopropyl (meth)acrylate and/or tert-butyl (meth)acrylate. When isopropyl (meth)acrylate and/or tert-butyl (meth)acrylate are/is used they are/is at the same time part of the recited monomer composition and are initially wholly or partly copolymerized into the polymers formed therefrom. In the course of the foaming step, (meth) acrylic acid repeat units are formed in the polymer by elimination of, respectively, propene and isobutene. Polymers derived from large proportions of these monomers or completely from these monomers are also usable in a special embodiment. The use of such polymerizable and/or polymerized comonomers that release blowing agents enables particularly small and regular cells to be obtained, for example.

Particularly suitable blowing agents are tert-butyl (meth) acrylate, isopropyl (meth)acrylate, tert-butanol, isopropanol and poly(tert-butyl (meth)acrylate).

The polymerization is preferably carried out in a shape-conferring vessel, in particular in the form of a chamber polymerization between two plates, for example glass plates. A rectangular bowl may be concerned in the simplest case for example. The polymerization in such a bowl will later result in a slab, the thickness of which was dictated by the fill level of the bowl and the distance between the plates. In addition, however, more complex shapes are conceivable for the vessel. The polymerization is preferably carried out at a temperature between 30 and 70° C. Useful initiators include not only commonly/generally known free-radical initiators, for example peroxides or azo initiators, but also redox systems or UV initiators. Polymerization temperatures below 40° C. apply particularly to these redox systems and UV initiators. UV initiators are initiated by irradiation with appropriate UV light, while redox initiators comprise two-component systems initiated by mixing the two components and the monomers.

Foaming may subsequently take place in the same vessel, in which case the volume increase is restricted to one direction, the open side of the vessel. Yet the polymerized material is also foamable without confining enclosure. Foaming is preferably carried out in an oven. Alternatively, foaming may be effected by irradiation with IR radiation, in particular at a wavelength between 0.78 and 2.20, preferably between 1.20 and 1.40 µm. Microwave foaming represents a further alternative. The combination of various methods, such as IR radiation, microwaves and/or heating in an oven is also conceivable.

Foaming as well as the prior polymerization may each be carried out in a plurality of temperature stages. The temperature may be raised later in the polymerizing step to additionally enhance the conversion and thereby reduce the residual monomer content. In the foaming step, a stagewise increase in the foaming temperature may be used to influence cell distribution, cell size and cell count.

Optionally, the process may also be carried out by performing the polymerization only incompletely, in this case preferably to a conversion of not less than 80%, and effecting the full, final polymerization in the course of the foaming step. Such a process has the advantage that the remaining monomers have a flexibilizing effect at the start of the foaming operation without apparently any flexibilizing compound remaining in the final foam. Therefore, in such an embodiment, the polymerization and the foaming would take place simultaneously to some extent—at one foaming temperature.

As well as the process, the present invention also provides PMMA foams obtainable via such a process for example. Such a PMMA foam is characterized in that the solid fraction of this foam consists to an extent not less than 95 wt % of a polymer composed of from 79.70 to 99.995 mol % of MMA, 0 to 20 mol % of one or more MMA-copolymerizable monomers, from 0.002 to 0.5 mol % of crosslinker, from 0.003 to 1.5 mol % of chain transfer agent fragment and an initiator fragment. The foam further has a density between 25 and 400 kg/m$^3$, preferably between 40 and 250 kg/m$^3$.

Preference is given in particular to PMMA foams in which the polymer was formed exclusively from MMA, an initiator, one or more crosslinkers selected from di-, tri- or tetra(meth)acrylates, allyl (meth)acrylate, triallyl cyanurate and/or triallyl isocyanurate, and one or more chain transfer agents selected from compounds having from one to five mercaptan groups and/or γ-terpinene, preferably selected from pentaerythritol tetrathioglycolate, 2-mercaptoethanol, alkyl mercaptans having from 2 to 12 carbon atoms, thioglycolic acid, thioglycolate and/or γ-terpinene.

The PMMA foams according to the present invention as well as the PMMA foams obtained according to the present invention are useful for many and varied purposes. Examples of such uses are weathering-resistant insulating materials, core material for sandwich composites, in lightweight construction, as packaging material, as energy absorbers in crash elements, in architectural building elements, as diffuser in lighting applications, in furniture construction, in boat construction, in vehicle construction, in the aerospace industry or in model building.

EXAMPLES

Comparative Example 1

In this example, a PMMA foam was produced from a composition containing a chain transfer agent but no crosslinker.

A mixture of 281.13 g of a polymethacrylate prepared exclusively from MMA, 1124.52 g of MMA, 0.75 g of 2,2"-azobis(2,4-dimethylvaleronitrile), 3.60 g of pentaerythritol tetrathioglycolate as chain transfer agent, 15.00 g of n-butyl acrylate and 75.00 g of tert-butyl methacrylate was polymerized at 42° C. for 24 h between two 400 mm*300 mm glass plates separated from each other by 10 mm and laterally sealed off by a rubber strip. This was followed by 4 h conditioning at 11500. After removal of the glass plates, the PMMA slab obtained was finally foamed in an oven at 215° C. for 1 h. A coarse-cell, very irregular foam was obtained.

Example 1

In this example, which is in accordance with the present invention, a PMMA foam was produced from a composition containing a relatively small amount of chain transfer agent and a relatively small amount of crosslinker.

A mixture of 281.25 g of a polymethacrylate prepared exclusively from MMA, 1125.00 g of MMA, 0.75 g of 2,2'-azobis(2,4-dimethylvaleronitrile), 0.60 g of pentaerythritol tetrathioglycolate as chain transfer agent, 15.00 g of n-butyl acrylate, 75.00 g of tert-butyl methacrylate, 1.50 g of Rewopol SB-DO 75 release agent and 0.90 g of ethylene glycol dimethacrylate as crosslinker was polymerized at 42° C. for 24 h between two 400 mm*300 mm glass plates separated from each other by 10 mm and laterally sealed off by a rubber strip. This was followed by 4 h conditioning at 115° C. After removal of the glass plates, the PMMA slab obtained was finally foamed in an oven at 215° C. for 1 h. The mixture foamed very well and the cells were considerably finer than in the foam obtained in according to Comparative Example 1.

The release agent is known from experience not to affect the polymerization or the foaming operation, and solely serves to facilitate removal of the glass plates from the polymer slab.

Examples 2 to 5

In this example, which is in accordance with the present invention, a PMMA foam was produced from various compositions containing varying amounts of chain transfer agent as well as a relatively small amount of crosslinker.

Mixtures consisting in each case of a polymethacrylate (see table 1 for the amount) prepared exclusively from MMA, MMA (see table 1 for the amount), 0.75 g of 2,2'-azobis-(2,4-dimethylvaleronitrile), pentaerythritol tetrathioglycolate as chain transfer agent (see table 1 for the amount), 15.00 g of n-butyl acrylate, 75.00 g of tert-butyl methacrylate, 1.50 g of Rewopol SB-DO 75 and 0.90 g of ethylene glycol dimethacrylate as crosslinker were polymerized at 42° C. for 24 h between two 400 mm*300 mm glass plates separated from each other by 10 mm and laterally sealed off by a rubber strip. This was followed by 4 h conditioning at 115° C. After removal of the glass plates, the PMMA slab obtained was finally foamed in an oven at 205° C. for 1 h. All the four mixtures foamed up very well. The greater the amount of chain transfer agent used, the faster the foaming.

The cells were distinctly finer than in the foam obtained as per Comparative Example 1.

TABLE 1

| Component | Example 2 | Example 3 | Example 4 | Example 5 |
|---|---|---|---|---|
| PMMA | 281.25 g | 281.19 g | 281.13 g | 281.01 g |
| MMA | 1125.00 g | 1124.76 g | 1124.52 g | 1124.04 g |
| Pentaerythritol tetrathioglycolate | 0.60 g | 0.90 g | 1.20 g | 1.80 g |

Example 6

In this example, which is in accordance with the present invention, a PMMA foam was produced from a composition containing a chain transfer agent and a crosslinker. No blowing agent was used here that is released from a copolymerizable constituent of the composition, but is freely present therein.

A mixture of 281.25 g of a polymethacrylate prepared exclusively from MMA, 1125.00 g of MMA, 0.75 g of 2,2'-azobis(2,4-dimethylvaleronitrile), 0.60 g of pentaerythritol tetrathioglycolate as chain transfer agent, 15.00 g of n-butyl acrylate, 75.00 g of isopropanol, 1.50 g of Rewopol SB-DO 75 and 0.90 g of ethylene glycol dimethacrylate as crosslinker was polymerized at 42° C. for 24 h between two 400 mm*300 mm glass plates separated from each other by 10 mm and laterally sealed off by a rubber strip. This was followed by 4 h conditioning at 115° C. After removal of the glass plates, the PMMA slab obtained was finally foamed in an oven at 215° C. for 1 h. A very efficiently foamed material having rather coarse cells was obtained.

Comparative Example 2

In this example, a PMMA foam was produced from a composition containing a chain transfer agent but no crosslinker.

A mixture of 162.21 g of a polymethacrylate prepared exclusively from MMA, 648.56 g of MMA, 0.85 g of 2,2'-azobis(2,4-dimethylvaleronitrile), 0.68 g of pentaerythritol tetrathioglycolate as chain transfer agent and 37.40 g of tert-butyl methyl ether was polymerized at 50° C. for 3 h between two 400 mm*300 mm glass plates separated from each other by 10 mm and laterally sealed off by a rubber strip. This was followed by 4 h conditioning at 115° C. After removal of the glass plates, the PMMA slab obtained was finally foamed in an oven at 215° C. for 1 h. The sample could not be foamed. All that happened is that small bubbles developed in the polymer.

Comparative Example 3

In this example, a PMMA foam was produced from a composition containing smaller amounts of chain transfer agent than in Comparative Example 2 and no crosslinker. The further change from Comparative Example 2 was a distinct increase in the amount of blowing agent.

A mixture of 162.00 g of a polymethacrylate prepared exclusively from MMA, 648.00 g of MMA, 0.85 g of 2,2'-azobis(2,4-dimethylvaleronitrile), 0.34 g of pentaerythritol tetrathioglycolate as chain transfer agent and 65.50 g of tert-butyl methyl ether was polymerized at 50° C. for 3 h between two 400 mm*300 mm glass plates separated from each other by 10 mm and laterally sealed off by a rubber strip. This was followed by 4 h conditioning at 115° C. After removal of the glass plates, the PMMA slab obtained was finally foamed in an oven at 215° C. for 1 h. The sample could not be foamed. All that happened is that small bubbles developed in the polymer.

Comparative Example 4

In this example, a PMMA foam was produced from a composition containing smaller amounts of chain transfer agent and no crosslinker. The blowing agent was varied as compared with Comparative Example 2.

A mixture of 167.00 g of a polymethacrylate prepared exclusively from MMA, 668.00 g of MMA, 0.85 g of 2,2'-azobis(2,4-dimethylvaleronitrile), 0.34 g of pentaerythritol tetrathioglycolate as chain transfer agent and 31.88 g of tert-butanol was polymerized at 50° C. for 3 h between two 400 mm*300 mm glass plates separated from each other by 10 mm and laterally sealed off by a rubber strip. This was followed by 4 h conditioning at 115° C. After removal of the glass plates, the PMMA slab obtained was finally foamed in an oven at 215° C. for 1 h. The sample could not be foamed. All that happened is that small bubbles developed in the polymer.

The invention claimed is:

1. A process for producing a polymethacrylate foam, said process comprising:
polymerizing at a temperature between 20° C. and 100° C. a composition comprising from 0.01 to 2.0 wt % of an initiator, from 2 to 20 wt % of a blowing agent, and from 75 to 97.9 wt % of a mixture to obtain a polymerized composition, and
subsequently foaming the polymerized composition at a temperature between 130° C. and 250° C.,
wherein
said mixture comprises
from 79.70 to 99.995 mol % of MMA monomers, polymers, oligomers or a combination of polymers and oligomers of MMA,
from 0 to 20 mol % of one or more MMA-copolymerizable monomers polymers, oligomers or a combination of polymers and oligomers of the MMA-copolymerizable monomers,
from 0.002 to 0.5 mol % of crosslinker, and
from 0.003 to 1.5 mol % of chain transfer agent, and
a total amount of the polymers, oligomers or combination of polymers and oligomers of MMA and the polymers, oligomers or combination of polymers and oligomers of the MMA-copolymerizable monomers in said mixture is up to 80 wt %,
wherein the chain transfer agent comprises pentaerythritol tetrathioglycolate.

2. The process according to claim 1, wherein the composition comprises
from 0.2 to 1.5 wt % of the initiator,
from 3 to 15 wt % of the blowing agent and
from 80 to 96.8 wt % of the mixture,
wherein
said mixture comprises
from 89.85 to 99.988 mol % of the MMA monomers, polymers, oligomers or combination of polymers and oligomers of MMA,
from 0 to 10 mol % of one or more the MMA-copolymerizable monomers, polymers, oligomers or combination of polymers and oligomers of the MMA-copolymerizable monomers,
from 0.005 to 0.3 mol % of the crosslinker, and
from 0.006 to 1 mol % of the chain transfer agent; and
a total amount of the polymers and/or oligomers of MMA and the polymers and/or oligomers of the MMA-copolymerizable monomers in said mixture is up to 50 wt %.

3. The process according to claim 1, wherein the temperature is between 30° C. and 70° C. for the polymerization and between 150° C. and 230° C. for the foaming.

4. The process according to claim 1, wherein the crosslinker comprises a di-, tri- or tetra(meth)acrylate, allyl (meth)acrylate, triallyl cyanurate, triallyl isocyanurate, or a mixture containing two or more thereof.

5. The process according to claim 1, wherein
the copolymerizable monomers comprise (meth)acrylic acid, methyl acrylate, ethyl (meth)acrylate, propyl (meth)acrylate, n-butyl (meth)acrylate, tert-butyl (meth)acrylate, isopropyl (meth)acrylate, isobutyl (meth)acrylate, styrene, (meth)acrylamide, an N-alkyl (meth)acrylamide having one to 12 carbon atoms in the alkyl group, a hydroxyalkyl (meth)acrylate having one to 4 carbon atoms in the alkyl group, or a mixture of two or more thereof, and
a total fraction of n-butyl (meth)acrylate and n-propyl (meth)acrylate, when present, does not exceed 3 wt %.

6. The process according to claim 1, wherein the polymerizing and the foaming are effected stagewise at different temperatures.

7. The process according to claim 1, wherein the polymerizing and the foaming are effected simultaneously to some extent at least.

8. The process according to claim 1, wherein the blowing agent comprises tert-butyl (meth)acrylate, isopropyl (meth)acrylate, tert-butanol, isopropanol, tort-butyl methyl ether, poly(tert-butyl (meth)acrylate), or a mixture of two or more thereof.

* * * * *